United States Patent
Pfleger et al.

(10) Patent No.: US 6,347,513 B2
(45) Date of Patent: Feb. 19, 2002

(54) METHOD FOR REGENERATING A NOX STORAGE CATALYTIC CONVERTER FOR AN INTERNAL COMBUSTION ENGINE

(75) Inventors: Corinna Pfleger, Donaustauf; Hong Zhang, Tegernheim, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/748,605

(22) Filed: Dec. 26, 2000

Related U.S. Application Data

(63) Continuation of application No. PCT/DE99/01624, filed on Jun. 1, 1999.

(30) Foreign Application Priority Data

Jun. 26, 1998 (DE) .......................................... 198 28 609

(51) Int. Cl.$^7$ ................................................ F01N 3/00
(52) U.S. Cl. .............................. 60/277; 60/274; 60/285; 60/295; 123/325; 123/326
(58) Field of Search .......................... 60/274, 285, 277, 60/295, 297, 301; 123/325, 326

(56) References Cited

U.S. PATENT DOCUMENTS

| | | | |
|---|---|---|---|
| 5,323,635 A | | 6/1994 | Ueno et al. |
| 5,875,628 A | * | 3/1999 | Mitsutani ..................... 60/276 |
| 5,887,421 A | * | 3/1999 | Mitsutani ..................... 60/274 |
| 6,021,638 A | * | 2/2000 | Hochmuth ..................... 60/274 |
| 6,089,017 A | * | 7/2000 | Ogawa et al. .................. 60/285 |
| 6,128,899 A | * | 10/2000 | Oono et al. ................... 60/295 |

FOREIGN PATENT DOCUMENTS

| | | |
|---|---|---|
| DE | 19626835 A1 | 1/1997 |
| DE | 19626837 A1 | 1/1997 |
| DE | 69400941 T2 | 4/1997 |
| DE | 19716275 C1 | 9/1998 |
| EP | 0560991 A1 | 9/1993 |
| EP | 0814248 A2 | 12/1997 |
| GB | 2307311 A | 5/1997 |
| JP | 07 238 851 A | 9/1995 |

* cited by examiner

*Primary Examiner*—Thomas Denion
*Assistant Examiner*—Binh Tran
(74) *Attorney, Agent, or Firm*—Herbert L. Lerner; Laurence A. Greenberg; Werner H. Stemer

(57) ABSTRACT

In a method for regenerating a NOx storage catalytic converter disposed in an engine exhaust operating with air excess, in operating ranges, the improvement includes storing NOx in the exhaust gas in the converter in a storage phase and catalytically converting the stored NOx in a regeneration phase. The signal of the NOx sensor disposed downstream of the converter is detected in the operating range of the overrun fuel cut-off and an average/minimum value is formed from the individual measured values. The average/minimum value is stored as an offset value of the sensor signal. In operating ranges beyond the engine overrun fuel cut-off, the signal of the NOx sensor is detected and the offset value is taken into account when the signal is processed further, in that the offset-corrected signal is compared with a threshold value. In the event that the threshold value is exceeded, a regeneration phase of the converter is initiated.

8 Claims, 2 Drawing Sheets

METHOD FOR REGENERATING A NOX STORAGE CATALYTIC CONVERTER FOR AN INTERNAL COMBUSTION ENGINE

CROSS-REFERENCE TO RELATED APPLICATION

This application is a continuation of copending International Application No. PCT/DE99/01624, filed Jun. 1, 1999, which designated the United States.

BACKGROUND OF THE INVENTION

Field of the Invention:

The invention relates to a method for regenerating a NOx storage catalytic converter for an internal combustion engine.

To further reduce the fuel consumption of spark-ignition internal combustion engines, internal combustion engines with lean combustion are being used with increasing frequency. In the case of spark-ignition internal combustion engines with lean combustion, the air excess is chosen to be great enough to allow the load requirement on the internal combustion engine. When there is a low load requirement, for example when there is a low torque or low or no acceleration, the fuel/air mixture with which the internal combustion engine is operated in stratified-charge mode may have lambda values of 3 and more.

To meet the exhaust emission limit values required, a special exhaust treatment is necessary in the case of such internal combustion engines. NOx storage catalytic converters are used for such purposes. These NOx storage catalytic converters are capable, on account of their coating, of absorbing from the exhaust gas NOx compounds that are produced in a storage phase in lean combustion. During a regeneration phase, the absorbed or stored NOx compounds are converted into harmless compounds by adding a reducing agent. CO, $H_2$, and HC (hydrocarbons) may be used as the reducing agent for lean-operated spark-ignition internal combustion engines. These are generated by briefly operating the internal combustion engine with a rich mixture and are made available to the NOx storage catalytic converter as components of the exhaust gas, whereby the stored NOx compounds in the catalytic converter are broken down.

European Patent Application EP 0 560 991 A1 discloses an absorber catalytic converter system with lean-mix operation, in which the switching over between lean operating phases and stoichiometric or enrichment operating phases takes place at comparatively roughly estimated points in time. In this case, the internal combustion engine is run for as long as possible in lean operation and then switched from a stoichiometric or enrichment operating phase back again to lean operation if it is assumed on the basis of a corresponding estimate that the NOx adsorber has regenerated again.

SUMMARY OF THE INVENTION

It is accordingly an object of the invention to provide a method for regenerating an NOx storage catalytic converter in the exhaust gas stream of an internal combustion engine that overcomes the hereinafore-mentioned disadvantages of the heretofore-known methods and devices of this general type and that determines the triggering point in time for the regeneration phase as accurately as possible.

With the foregoing and other objects in view, there is provided, in accordance with the invention, a method for regenerating a NOx storage catalytic converter disposed in an exhaust gas stream of an internal combustion engine operating with air excess, at least in certain operating ranges, which converter stores NOx contained in the exhaust gas of the internal combustion engine in a storage phase, and which converter catalytically converts stored NOx in a regeneration phase, including the steps of disposing a NOx sensor downstream of a NOx storage catalytic converter for evaluating a signal of the NOx sensor, detecting the signal of the NOx sensor in the operating range of the overrun fuel cut-off of the engine, forming at least one of an average value and a minimum value from individual measured values of the signal and storing the at least one of the average value and the minimum value as an offset value of the signal, in operating ranges of the engine beyond the overrun fuel cut-off, detecting the signal of the NOx sensor and taking into account the offset value when the signal is processed further, comparing an offset-corrected signal with a threshold value, and emptying the NOx storage catalytic converter by catalytically converting stored NOx through addition of a reducing agent in a regeneration phase in the event that the threshold value is exceeded.

According to the invention, the signal of the NOx sensor is detected in the operating range of the overrun fuel cut-off of the internal combustion engine and an average value is formed from the individual measured values. The average value is stored as an offset value of the sensor signal. In operating ranges of the internal combustion engine beyond the overrun fuel cut-off, the signal of the NOx sensor is detected and the offset value is taken into account when the signal is processed further. The offset-corrected signal is compared with a threshold value. In the event that the threshold value is exceeded, a regeneration phase of the NOx storage catalytic converter is initiated.

According to one development of the method according to the invention, in the operating range of the overrun fuel cut-off, the air mass flowing into an intake tract of the internal combustion engine is summed and the determination of the offset value is enabled only when the air-mass sum exceeds a threshold value. Such determination ensures that the NOx storage catalytic converter is adequately purged with fresh air and that NOx from the last combustion is no longer present in the exhaust gas, which may falsify the adaptation of the offset of the sensor signal.

In accordance with a further mode of the invention, there is provided the step of determining the offset value by an arithmetic and/or sliding averaging of the individual measured values.

In accordance with an added mode of the invention, there is provided the step of fixing the threshold value for initiating the regeneration phase as a function of the air mass stream in the intake tract.

In accordance with a concomitant feature of the invention, there is provided the step of storing the threshold value in a characteristic map of a memory of a control device for controlling the internal combustion engine.

Other features that are considered as characteristic for the invention are set forth in the appended claims.

Although the invention is illustrated and described herein as embodied in a method for regenerating a NOx storage catalytic converter for an internal combustion engine, it is nevertheless not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
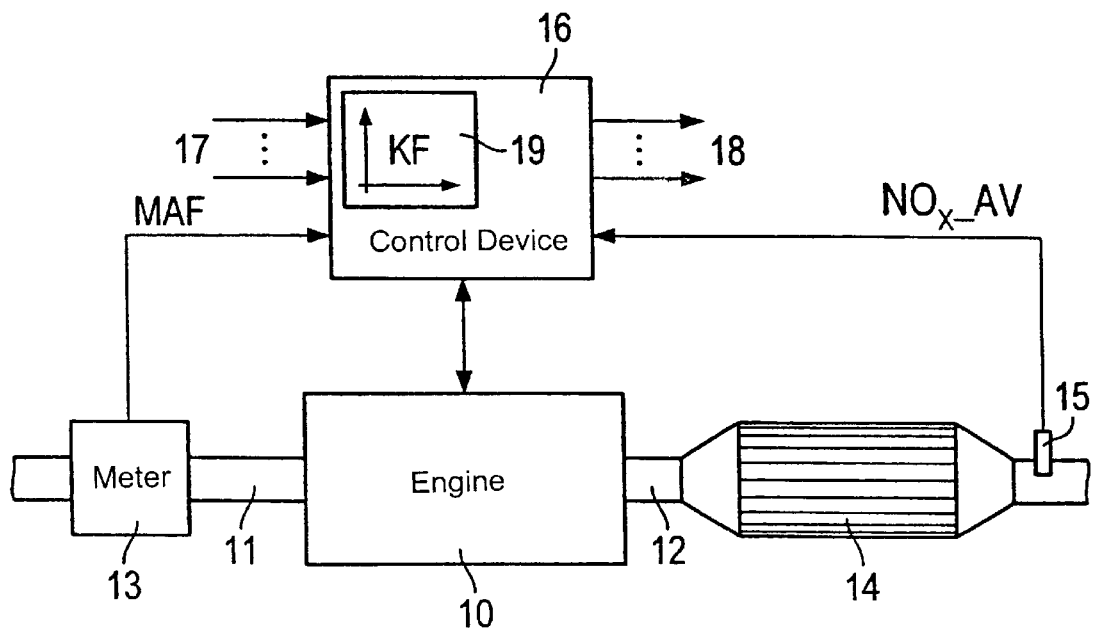
FIG. 1 is a block circuit diagram of an engine with a NOx storage catalytic converter according to the invention.

In all the figures of the drawing, sub-features and integral parts that correspond to one another bear the same reference symbol in each case.

The method according to the invention serves for operating and regenerating the exhaust treatment system of an internal combustion engine operating with air excess, at least in certain operating phases. Referring now to the figures of the drawings in detail and first, particularly to FIG. 1 thereof, there is shown such an engine. In this case, only those parts and components that are necessary for understanding the invention are shown in the figure.

The internal combustion engine 10 has an intake tract 11 and an exhaust tract 12. Disposed in the intake tract 11 is an air-mass meter 13 for sensing the air mass flowing into the cylinders of the internal combustion engine 10 for combustion. Located in the exhaust tract 12 of the internal combustion engine 10 is a NOx storage catalytic converter 14. Provided downstream of the NOx storage catalytic converter is a measuring pickup 15 in the form of a NOx sensor. The signals MAF of the air-mass meter 13 and NOx_AV of the NOx sensor 15 are fed to a control device 16.

Further input signals and control parameters required for the controlled or regulated operation of the internal combustion engine 10, such as, for example, the gas pedal position, the temperature of the intake air, the throttle valve position, the signals of knocking sensors, the battery voltage, the requirements for the handling dynamics, etc., are likewise fed to the control device 16 and are identified generally in FIG. 1 by reference numeral 17. With the aid of such control parameters, the internal combustion engine is controlled or regulated in the control device 16 by executing stored control routines. For such a purpose, signals are used to activate various actuators, such as a servomotor and a final controlling element, for example, the throttle valve and the injection valves. The signals are identified generally in FIG. 1 by reference numeral 18. Furthermore, the control device 16 has a memory 19, in which there is stored, inter alia, a characteristic map KF, which is explained in detail in the description of FIGS. 2 to 4.

During operation, the control device 16 activates the internal combustion engine 10 optionally in lean operation, i.e., with a setpoint lambda value greater than one, or in stoichiometric or enrichment operation, i.e., with a lambda value equal to or less than one. After a certain period of time of lean operation, the NOx storage catalytic converter 14 must be regenerated. Regeneration takes place by switching over to enrichment operation at a suitable point in time, which is fixed, for example, by using an estimate, calculation, or measurement with regard to the amount of nitrogen oxides stored in the NOx storage catalytic converter. A regeneration phase can also be initiated if the control device 16 establishes that the amount of NOx introduced into the NOx storage catalytic converter 14 reaches or exceeds a prescribed threshold value. The amount of NOx may be calculated from a model as a function of characteristic operating variables of the internal combustion engine 10. The rotational speed, load (air mass, quantity of fuel injected), ignition angle, lambda value of the exhaust gas upstream of the NOx storage catalytic converter, intake air temperature, valve overlap, exhaust gas recirculation, etc. may be used as characteristic operating variables. Consequently, the amount of NOx stored in the NOx storage catalytic converter 14 at any point in time of the storage phase is known from the model.

It is also possible, by detecting and evaluating the output signal of the NOx sensor 15, to initiate a regeneration phase. Due to component tolerances, the signal of the NOx sensor 15 has a specific offset, by which the measurement result is falsified. In order to carry out a regeneration of the NOx storage catalytic converter 14 with adequate accuracy and high efficiency, the sensor offset is taken into account in the determination of the triggering point in time of the regeneration phase.

Figure 2:
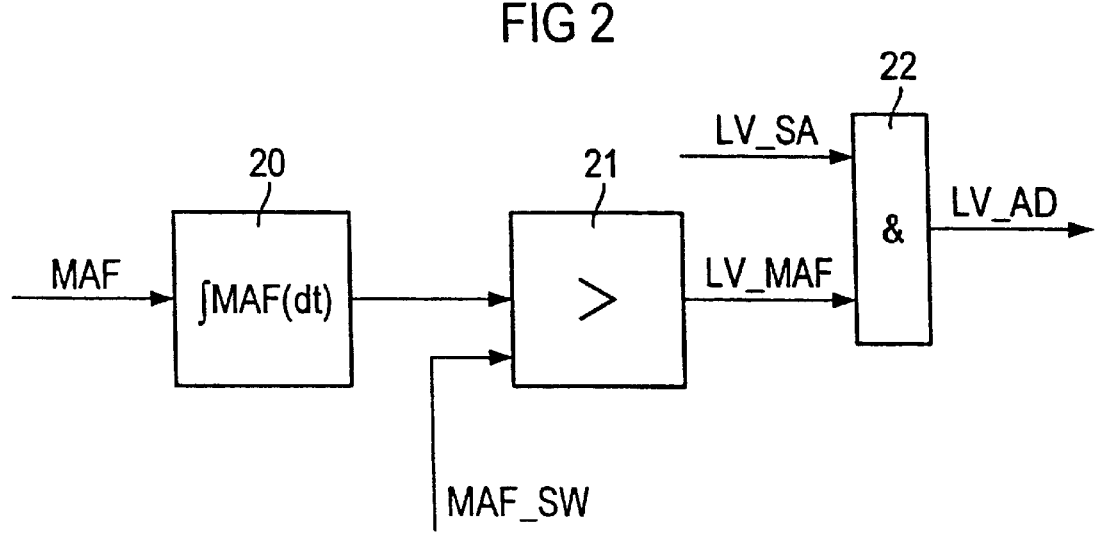
FIG. 2 is a block circuit diagram for enabling the offset adaptation of the NOx sensor signal according to the invention.
Figure 3:
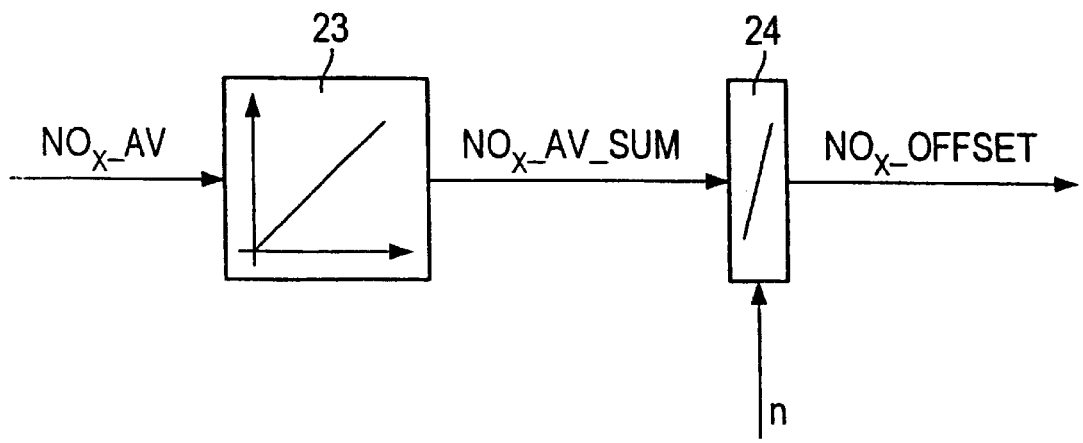
FIG. 3 is a block circuit diagram for determining the offset of the NOx sensor signal according to the invention.
Figure 4:
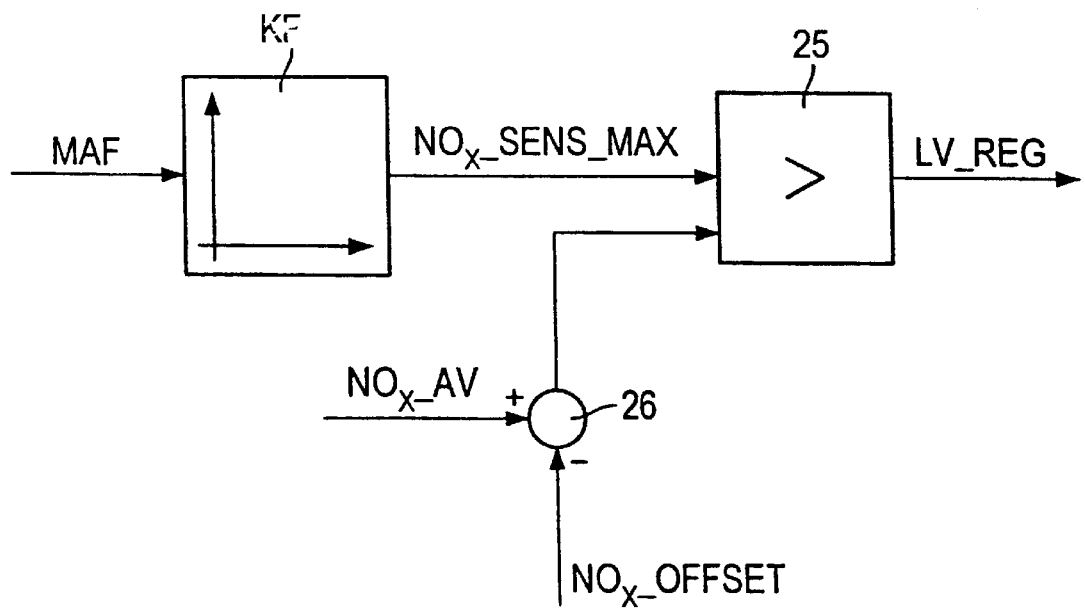
FIG. 4 is a block circuit diagram for triggering the regeneration phase for the NOx storage catalytic converter according to the invention.

The following description of FIGS. 2 to 4 describes how, in certain operating ranges of the internal combustion engine 10, the sensor offset of the NOx sensor can be determined and adapted and the offset-corrected sensor signal can be used for triggering a regeneration phase.

FIG. 2 shows a block circuit diagram for enabling the offset adaptation of the NOx sensor signal. The air mass MAF flowing into the cylinders of the internal combustion engine 10 is detected by the air-mass meter 13 and is fed to a block 20, which sums, for example, integrates, the individual values for the air mass.

The air-mass integral is fed to a block 21, which contains a comparison device for comparing the air-mass integral value with a prescribed threshold value MAF_SW for the summed air mass. The threshold value MAF_SW is determined either by test-bench tests or in driving operation, and is stored in the memory 19 of the control device. If the value of the air-mass integral is above the threshold value MAF_SW, a logical variable LV_MAF is present at the output of the block 21 and is passed to the input of an AND gate 22. A logical variable LV_SA, which indicates that the engine 10 is in overrun fuel cut-off operation, is passed to the further input of the AND gate 22. In the operating state of overrun fuel cut-off, the fuel injection is stopped. Consequently, no combustion can take place in the cylinder and, as a result, no NOx can be generated in the exhaust gas either.

If both conditions are satisfied, i.e., the internal combustion engine is in the operating state of overrun fuel cut-off and the value of the air-mass integral is above the threshold value, it is assumed that the NOx storage catalytic converter 14 and the exhaust tract 12 have been purged adequately with fresh air. In such a case, a logical variable LV_AD is present at the output of the AND gate 22 for enabling the adaptation of the NOx sensor signal.

FIG. 3 illustrates how the offset NOx_OFFSET of the NOx sensor signal is determined when the adaptation is enabled in the operating state of overrun fuel cut-off. The current values of the signal detected by the NOx sensor 15 are read in by the control device 16 in a prescribed time frame and summed in a block 23. The sum NOx_SUM_AV obtained is fed to a block 24, which divides the sum by the number of measurements n. The value averaged represents the sensor offset NOx_OFFSET and is stored in the memory 19 of the control device 16, in that the old adaptation value stored therein is overwritten.

In addition to the averaging mentioned, taken over the number of measurements, the value for the sensor offset NOx_OFFSET can also be obtained by a sliding averaging based on the following equation:

$$NOx\_GMW_i = NOx\_GMW_{i-1} * (1-MITKO) + MITKO * NOx_i,$$

where: $NOx\_GMW_i$ denotes the new average value;

$NOx\_GMW_{i-1}$ denotes the average value from the preceding calculation;

MITKO denotes an averaging constant with a value range between 0 and 1; and $NOx_i$ denotes the current measured value of the NOx sensor.

A low-pass filter (PT1 element) may be used, for example, to realize such a sliding averaging. In addition, the offset adaptation can also be carried out by a minimum-value search. For such a purpose, the smallest sensor signal value occurring after enabling of the offset adaptation is stored.

The adaptation procedure is performed each time during the overrun fuel cut-off operation of the internal combustion engine as long as the adaptation condition (air-mass integral greater than the prescribed threshold value) is also satisfied.

FIG. 4 illustrates how the signal of the NOx sensor 15 is evaluated for triggering a regeneration phase for the NOx storage catalytic converter 14. The air-mass meter 13 detects the air mass stream MAF in the intake tract 11, which serves as an input variable for a characteristic map KF that is stored in the memory 19 of the control device 16. Stored in the characteristic map KF, dependent on the air mass stream, are threshold values for a maximum NOx concentration in ppm NOx_SENS_MAX. The read-out threshold value is passed to a first input of a block 25, which contains a comparison device.

At a summation point 26, the offset NOx_OFFSET, as obtained by the method described above, is subtracted from the signal NOx_AV detected by the NOx sensor 15 during the fired operation of the internal combustion engine. The offset-corrected signal is passed to the further input of the block 25. If the offset-corrected signal exceeds the air-mass-stream-dependent threshold value NOx_SENS_MAX, a logical variable LV_REG for initiating a regeneration phase is present at the output of the block 25.

The blocks 20, 21, 22, 23, 24, 25, and 26 are represented in the exemplary embodiment as single components, but they may also be realized as program routines in the control device 16.

We claim:

1. In a method for regenerating a NOx storage catalytic converter disposed in an exhaust gas stream of an internal combustion engine operating with air excess, at least in certain operating ranges, the engine having an overrun fuel cut-off, the improvement which comprises:

storing NOx contained in the exhaust gas of the internal combustion engine in the catalytic converter in a storage phase;

catalytically converting the stored NOx in the catalytic converter in a regeneration phase;

placing a NOx sensor downstream of the NOx storage catalytic converter for evaluating a signal of the NOx sensor;

detecting the signal of the Nox sensor in the operating range of the overrun fuel cut-off of the engine;

forming at least one of an average value and a minimum value from individual measured values of the signal and storing the at least one of the average value and the minimum value as an offset value of the signal;

detecting the signal of the NOx sensor in operating ranges of the engine beyond the overrun fuel cut-off, and taking the offset value into account when the signal is processed further;

comparing an offset-corrected signal with a threshold value; and emptying the NOx storage catalytic converter by catalytically converting stored NOx through addition of a reducing agent in a regeneration phase in the event that the threshold value is exceeded.

2. The method according to claim 1, which further comprises:

summing an air mass flowing into an intake tract of the engine during a predetermined time period in an operating range of the overrun fuel cut-off; and enabling the determination of the offset value only when an air-mass sum exceeds a prescribed threshold value.

3. The method according to claim 1, which further comprises determining the offset value by an arithmetic averaging of the individual measured values of the signal.

4. The method according to claim 1, which further comprises determining the offset value by a sliding averaging of the individual measured values of the signal.

5. The method according to claim 1, which further comprises fixing the threshold value for initiating the regeneration phase as a function of an air mass stream in an intake tract of the engine.

6. The method according to claim 5, which further comprises storing the threshold value in a characteristic map of a memory of a control device for controlling the engine.

7. In a method for regenerating a NOx storage catalytic converter disposed in an exhaust gas stream of an internal combustion engine operating with air excess, at least in certain operating ranges, the engine having an overrun fuel cut-off, the improvement which comprises:

storing NOx contained in the exhaust gas of the internal combustion engine in the catalytic converter in a storage phase;

catalytically converting the stored NOx in the catalytic converter in a regeneration phase;

placing a NOx sensor downstream of the NOx storage catalytic converter for evaluating a signal of the NOx sensor;

detecting the signal of the NOx sensor in the operating range of the overrun fuel cut-off of the engine;

forming an average value from individual measured values of the signal and storing the average value as an offset value of the signal;

detecting the signal of the NOx sensor in operating ranges of the engine beyond the overrun fuel cut-off, and taking the offset value into account when the signal is processed further;

comparing an offset-corrected signal with a threshold value; and emptying the NOx storage catalytic converter by catalytically converting stored NOx through addition of a reducing agent in a regeneration phase in the event that the threshold value is exceeded.

8. In a method for regenerating a NOx storage catalytic converter disposed in an exhaust gas stream of an internal combustion engine operating with air excess, at least in certain operating ranges, the engine having an overrun fuel cut-off, the improvement which comprises:

storing NOx contained in the exhaust gas of the internal combustion engine in the catalytic converter in a storage phase;

catalytically converting the stored NOx in the catalytic converter in a regeneration phase;

placing a NOx sensor downstream of the NOx storage catalytic converter for evaluating a signal of the NOx sensor;

detecting the signal (NOx_AV) of the NOx sensor in the operating range of the overrun fuel cut-off of the engine;

forming a minimum value from individual measured values of the signal and storing the minimum value as an offset value of the signal;

detecting the signal of the NOx sensor in operating ranges of the engine beyond the overrun fuel cut-off, and taking the offset value into account when the signal is processed further;

comparing an offset-corrected signal with a threshold value; and emptying the NOx storage catalytic converter by catalytically converting stored NOx through addition of a reducing agent in a regeneration phase in the event that the threshold value is exceeded.

* * * * *